(12) United States Patent
Hamaguchi (10) Patent No.: US 10,654,658 B2
(45) Date of Patent: May 19, 2020

(54) CONTROL SYSTEM FOR MECHANICAL EQUIPMENT

(71) Applicant: Daifuku Co., Ltd., Osaka-Shi, Osaka (JP)

(72) Inventor: Jun Hamaguchi, Shiga (JP)

(73) Assignee: Daifuku Co., Ltd. (JP)

( * ) Notice: Subject to any disclaimer, the term of this patent is extended or adjusted under 35 U.S.C. 154(b) by 60 days.

(21) Appl. No.: 16/034,824

(22) Filed: Jul. 13, 2018

(65) Prior Publication Data

US 2018/0327193 A1 Nov. 15, 2018

Related U.S. Application Data

(63) Continuation of application No. PCT/JP2016/087045, filed on Dec. 13, 2016.

(30) Foreign Application Priority Data

Jan. 15, 2016 (JP) .................................. 2016-005826

(51) Int. Cl.
*B65G 43/08* (2006.01)
*B65G 1/00* (2006.01)
(Continued)

(52) U.S. Cl.
CPC .............. *B65G 43/08* (2013.01); *B65G 1/00* (2013.01); *B65G 1/04* (2013.01); *B65G 47/261* (2013.01); *B66F 9/02* (2013.01); *G05B 19/409* (2013.01); *G05B 19/418* (2013.01); *G05B 19/4189* (2013.01); *H04Q 9/00* (2013.01); *B65G 2203/0233* (2013.01);
(Continued)

(58) Field of Classification Search
CPC combination set(s) only.
See application file for complete search history.

(56) References Cited

U.S. PATENT DOCUMENTS 5,517,404 A * 5/1996 Biber ..................... D01H 13/14
57/264
2014/0172128 A1* 6/2014 Johnson ................. E02F 9/205
700/83

FOREIGN PATENT DOCUMENTS

JP 2015214378 A 12/2015
JP 2015233223 A 12/2015

* cited by examiner

*Primary Examiner* — Kyle O Logan
(74) *Attorney, Agent, or Firm* — St. Onge Steward Johnston & Reens LLC (57) ABSTRACT

A control system for mechanical equipment is provided with: a manual operation mechanism provided with a minimum required number of operation switches and a mechanical equipment identification signal transmission unit for transmitting a mechanical equipment identification signal that identifies mechanical equipment; an operation assistance terminal in which the mechanical equipment identification signal received from the transmission unit is used as a basis to display a manual operation assistance screen including a manually operated device selection section and a control content display section that displays control content assigned to the operation switches of the manual operation mechanism for a selected manually operated device; and a control device that connects the control unit of an identified control target device and the operation switches of the manual operation mechanism by receiving a control target device switching signal identified by operation of the manually operated device selection section.

6 Claims, 5 Drawing Sheets

(51) Int. Cl.
*H04Q 9/00* (2006.01)
*G05B 19/418* (2006.01)
*B65G 1/04* (2006.01)
*B65G 47/26* (2006.01)
*B66F 9/02* (2006.01)
*G05B 19/409* (2006.01)

(52) U.S. Cl.
CPC .............. *G05B 2219/35413* (2013.01); *G05B 2219/36159* (2013.01); *Y02P 90/02* (2015.11); *Y02P 90/12* (2015.11)

CONTROL SYSTEM FOR MECHANICAL EQUIPMENT

FIELD OF THE INVENTION

The present invention relates to a control system for mechanical equipment in which when mechanical equipment is normally automatically operated but needs to be manually operated, by utilization of an operation assistance terminal generally referred to as a tablet and the like, a plurality of control target devices included in the mechanical equipment can be manually operated simply and without being erroneously operated.

BACKGROUND OF THE INVENTION

As a conventional system for manually operating mechanical equipment, a system in which a manual operation panel is fixedly installed for each area where an operator can visually recognize a control target or a system which utilizes, as described in Japanese Published Unexamined Patent Application: No. 2015-214378 (Patent Literature 1), an operation terminal carried by an operator entering the site of the mechanical equipment, that is, an operation terminal which is brought into a connected state by a communication means to a control device of the mechanical equipment in front of the operator has been known. In the former system of hardware configuration in which the fixedly installed manual operation panel is used, as the scale of the mechanical equipment is increased, the number of manual operation panels installed is increased, and moreover, the number of operation switches included in each of the manual operation panels is significantly increased, with the result that the cost of the equipment including wiring between the control target and the control device is significantly increased. By contrast, with the latter system of software configuration which utilizes the portable operation terminal, it is possible to significantly decrease the cost of the equipment.

SUMMARY OF THE INVENTION

However, in the system of software configuration as described above, as compared with the fixedly installed manual operation panel of hardware, an operator performs a necessary operation by a method such as performing a touch operation by fingertip or performing a click operation by overlapping a cursor on the screen with respect to imaginary operation switches displayed on a very narrow and small screen of the portable operation terminal. Therefore, as the number of displayed imaginary operation switches is increased, it is more difficult to perform the operation without fail and reliably. Moreover, in a case of the communication means for connecting the portable operation terminal and the control device, in particular, in a case of a wireless communication means, a time lag may occur between the operation and the actual movement in some cases, and it is significantly difficult to perform an operation such as finely moving a control target device by an inching operation.

The present invention proposes a control system for mechanical equipment which can solve the conventional problem as described above, and for ease of understanding of a relationship with an embodiment which will be described later, the control system for mechanical equipment according to the present invention will be shown with reference signs which are used in the description of the embodiment and which are placed in parentheses. The control system for mechanical equipment according to the present invention is configured such that the control system for mechanical equipment uses mechanical equipment (1/13) which includes a plurality of control target devices and a control device (28) controlling the control target devices, a manual operation means (5/25) which is additionally provided in the mechanical equipment (1/13), a portable operation assistance terminal (30), and a communication means (regardless of wireless or wired) (34) which connects the operation assistance terminal (30) and the control device (28) of the mechanical equipment (1/13), where the manual operation means (5/25) includes an operation switch (6, 7) which is used in common for control of the respective control target devices included in the mechanical equipment (1/13) including the manual operation means (5/25), and a mechanical equipment identification signal transmission unit (11/26) which is used for transmitting, to the operation assistance terminal (30), a mechanical equipment identification signal for identifying the mechanical equipment (1/13) including the manual operation means (5/25), on the operation assistance terminal (30), a manual operation assistance screen (44, 48) is displayed which includes a manually operated device selection section (44a, 44b) for selecting, from the plurality of control target devices included in the mechanical equipment (1/13), a manually operated device based on the mechanical equipment identification signal received from the mechanical equipment identification signal transmission unit (11/26), and a control content display section (44a1 to 44b2, 54a to 55f) which displays, on the selected manually operated device, control content assigned to the operation switch (6, 7) of the manual operation means (5/25), the control device (28) receives, from the operation assistance terminal (30), via the communication means (34), a control target device switching signal (35) identified by an operation on the manually operated device selection section (44a, 44b) so as to connect a control unit of the identified control target device and the operation switch (6, 7) of the manual operation means (5/25), and, by operating the operation switch (6, 7) of the manual operation means (5/25), the control assigned to the operation switch (6, 7) is performed by the selected control target device.

In the control system for mechanical equipment according to the configuration of the present invention described above, in such a case where, in a factory or the like where a large number of pieces of mechanical equipment are provided, a specific type of mechanical equipment which is normally automatically operated needs to be manually operated, an operator goes to the site while carrying the operation assistance terminal, and reads the mechanical equipment identification signal from the transmission unit of the manual operation means included in the intended mechanical equipment. Consequently, the control device of the mechanical equipment to be manually operated in front of the operator and the operation assistance terminal carried by the operator are connected via the communication means, the manual operation assistance screen is displayed on the screen of the operation assistance terminal, and thus the operator performs an operation for selecting the control target device to be manually operated from the manually operated device selection section on the manual operation assistance screen, with the result that the control unit of the identified control target device and the operation switch of the manual operation means are connected. By the connection, the type of control for the control target device is assigned not to the operation assistance terminal but to the operation switch of the manual operation means included in the mechanical equipment to be manually operated, and it is possible to find, with the control content display section on the manual operation assistance screen of the operation assistance terminal carried by the operator, what type of control is assigned to which operation switch. Therefore, the operator can manually operate the control target device by physically operating the operation switch of the manual operation means based on the type of control found with the control content display section.

Therefore, according to the configuration of the present invention, as the target which is actually operated by the operator at the time of the manual operation, not an imaginary operation panel on the manual operation assistance screen of the carried operation assistance terminal but the actually-existing operation switch of the manual operation means is physically operated, therefore, as compared with a case where the control signal is transmitted from the operation assistance terminal via the communication means (in particular, the wireless communication means) to the control unit of the control device, a time lag from the operation to the actual activation of the control target device is reduced. In addition, an effect of an event which causes a failure in the wireless communication such as various electromagnetic waves generated by the activation of mechanical equipment within a factory and the like is not received, and even if an inching operation is needed, the possibility of an erroneous operation caused by an unfamiliarity with operation on the screen is totally eliminated, with the result that a necessary operation can be performed accurately and reliably.

Moreover, even in a case where a large number of manually operated devices are present within the mechanical equipment, only by selecting each of the manually operated devices by the manually operated device selection section, control for the newly selected manually operated device is assigned to the operation switch of the same manual operation means, the assignment status of the control to the operation switch is confirmed on the manual operation assistance screen of the operation assistance terminal, then the operation switch of the same manual operation means is operated, and thus it is possible to manually operate the new manually operated device. Therefore, in the mechanical equipment, regardless of the number of manually operated devices, it suffices to install one manual operation means having the minimum required number of operation switches, and thus it is possible to significantly reduce the cost of the equipment. In addition, as compared with a case where a large manual operation means (control panel) which has a large number of operation switches is operated, the possibility of an erroneous operation is almost completely eliminated.

It is noted that, in a case where the present invention is implemented, specifically, as the operation switch of the manual operation means (5, 25), two operation switches (6, 7) to which operations opposite to each other such as an ON operation and an OFF operation, an advancing operation and a retracting operation, or a raising operation and a lowering operation are assigned are provided, and in addition to the two operation switches (6, 7), an emergency stop switch (8) is provided, such that the present invention is preferably implemented with the manual operation means (5, 25) having the minimum required number of operation switches (6 to 8).

In addition, as the mechanical equipment identification signal transmission means for transmitting the mechanical equipment identification signal for identifying the mechanical equipment from the manual operation means to the operation assistance terminal, since the operation assistance terminal carried by the operator is close to the manual operation means included in the mechanical equipment to be manually operated, a near field communication means, a freely detachable communication line (wired line) or the like for connecting the manual operation means and the operation assistance terminal such that they can communicate with each other can also be utilized. In other words, as the mechanical equipment identification signal transmission unit which is provided in the manual operation means in order to transmit, to the operation assistance terminal, the mechanical equipment identification signal for identifying the mechanical equipment including the manual operation means, according to various types of communication means as described above, a wireless signal transmission means, a connector which connects the communication line on the side of the operation assistance terminal, a communication line which is freely connected to a communication line connector on the side of the operation assistance terminal or the like can be utilized. In particular, the transmission unit (11, 26) can be formed by sticking, to the external surface of the manual operation means (5, 25), a sheet displaying a code (12, 27) which can be read and determined by an image capturing means (32) included in the operation assistance terminal (30). According to this configuration, it is not necessary to provide the electrical mechanical equipment identification signal transmission unit on the side of the manual operation means, and moreover, a camera included in a device which can be utilized as the operation assistance terminal and which is generally referred to as a tablet is utilized, the mechanical equipment identification signal transmission means can thereby be formed at very low cost.

It is noted that, preferably, on the operation assistance terminal, not only the manual operation assistance screen but also a display surface (42, 46) which displays a drawing or a photograph displaying the configuration of the corresponding mechanical equipment is additionally displayed, and thus it is configured such that various types of information on the mechanical equipment to be manually operated are available.

In addition, in a case where it is the mechanical equipment (1) which can operate each of the control target devices with arbitrary timing, a mechanical equipment state display screen (43) which displays a list of all the control target devices in the mechanical equipment (1) and a state in which whether or not each of the control target devices in the list can be manually operated can be added to the operation assistance terminal (30). In a case where it is the mechanical equipment (13) which operates the respective control target devices in a set order, a mechanical equipment state display screen (47) which displays a list of operations of the respective control target devices in the set order and which displays the list such that in the list, the state of progress of a manually operated operation can be distinguished can be added to the operation assistance terminal (30). As described above, the configuration of the display screen on the operation assistance terminal can be changed according to whether or not any restriction is provided in a case where each of the control target devices included in the mechanical equipment is controlled by manual operation such that the operator can manually operate the intended device easily and without fail.

Furthermore, the control device (28) can be configured such that the control device (28) can receive, when a manual operation completion condition set on the side of the control device is satisfied, for example, when a manual operation signal is not received from the manual operation means (5/25) after the last manual operation until a set time elapses or when a termination signal (36b) is received from the operation assistance terminal (30) that is connected, an operation signal from another operation assistance terminal.

DETAILED DESCRIPTION OF THE INVENTION

Figure 1A:
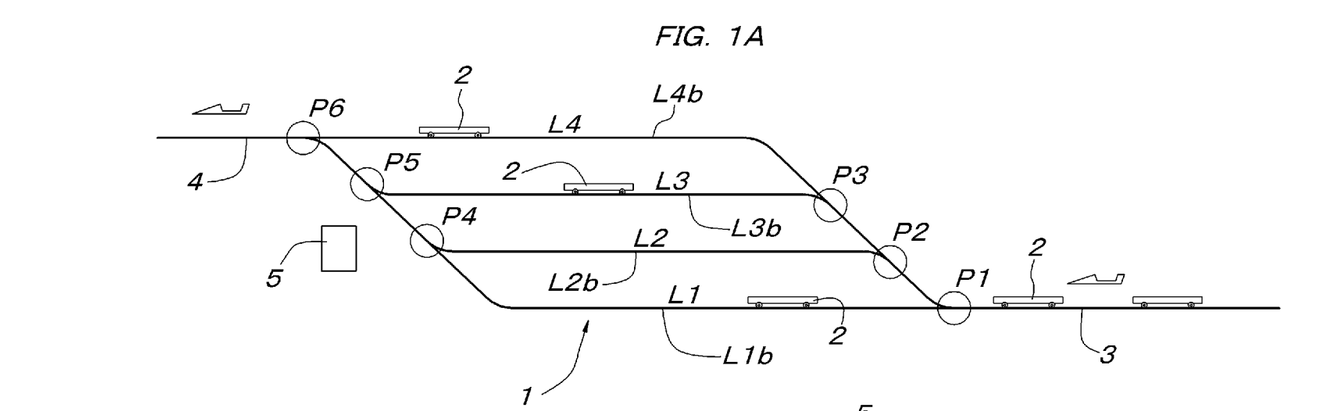
FIG. 1A is an illustrative view of mechanical equipment including a plurality of conveyance carriage traveling lines.

In mechanical equipment 1 shown in FIG. 1A, a plurality of conveyance carriage traveling lines L1 to L4 parallel to each other which are provided between an entrance path 3 and an exit path 4 for a conveyance carriage 2 are arranged. The plurality of conveyance carriage traveling lines L1 to L4 are used as an operation line for a workpiece loaded on the conveyance carriage 2 and a storage line for an empty conveyance carriage 2 or the conveyance carriage 2 on which the workpiece is loaded, or the like. In the respective conveyance carriage traveling lines L1 to L3, carriage drive means L1d to L4d for making the conveyance carriage 2 travel forward at a predetermined speed are provided. Between the entrances of the respective conveyance carriage traveling lines L1 to L3 and the entrance path 3, entrance side path switching means P1 to P3 for selectively connecting the entrance path 3 to the respective conveyance carriage traveling lines L1 to L3 are provided, and between the exits of the respective conveyance carriage traveling lines L2 to L4 and the exit path 4, exit side path switching means P4 to P6 for selectively connecting the respective conveyance carriage traveling lines L2 to L4 to the exit path 4 are provided.

Figure 1B:
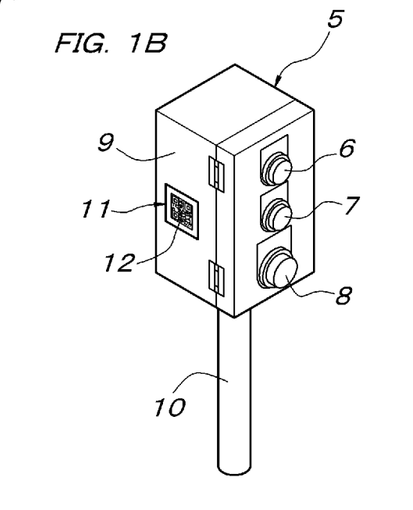
FIG. 1B is a perspective view showing a manual operation means additionally provided in the mechanical equipment.

In the mechanical equipment 1 described above, a manual operation means 5 is additionally provided in a place where the entire mechanical equipment 1 can be seen. As shown in FIG. 1B, in the manual operation means 5, an operation box 9 in which an operation switch 6 for a positive operation, an operation switch 7 for a negative operation, and an emergency stop operation switch 8 are arranged is supported by a column 10, and although as the operation switches 6 to 8, push button switches as shown in the figure are generally used, the operation switches of another arbitrary form (configuration) can be used. Furthermore, in an appropriate place on the outside surface of the operation box 9 in the manual operation means 5, a mechanical equipment identification signal transmission unit 11 is provided that transmits a mechanical equipment identification signal for identifying the mechanical equipment 1 to an operation assistance terminal which will be described later. The mechanical equipment identification signal transmission unit 11 can be formed by sticking, to an appropriate place on the outside surface of the operation box 9, a sheet on which a two-dimensional matrix barcode (hereinafter referred to as a two-dimensional matrix code in short) 12 indicating the mechanical equipment identification signal for identifying the mechanical equipment 1 is printed.

Figure 2A:
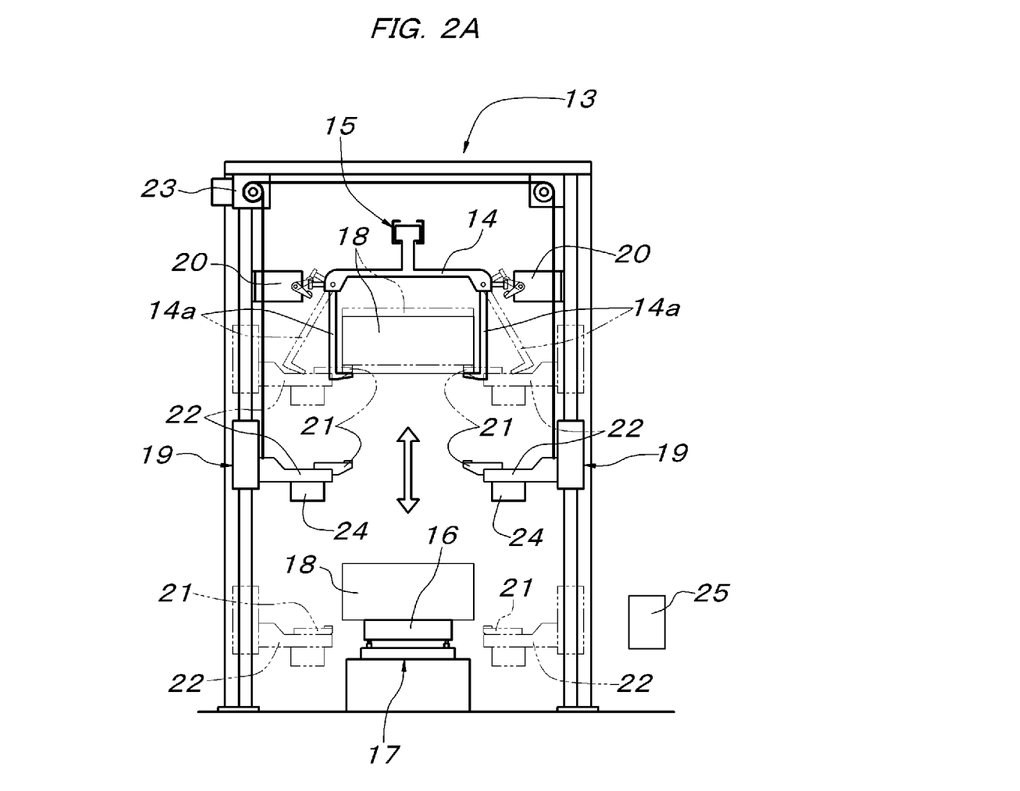
FIG. 2A is an illustrative view of mechanical equipment including a lifter which raises and lowers a workpiece so as to transfer the workpiece.
Figure 2B:
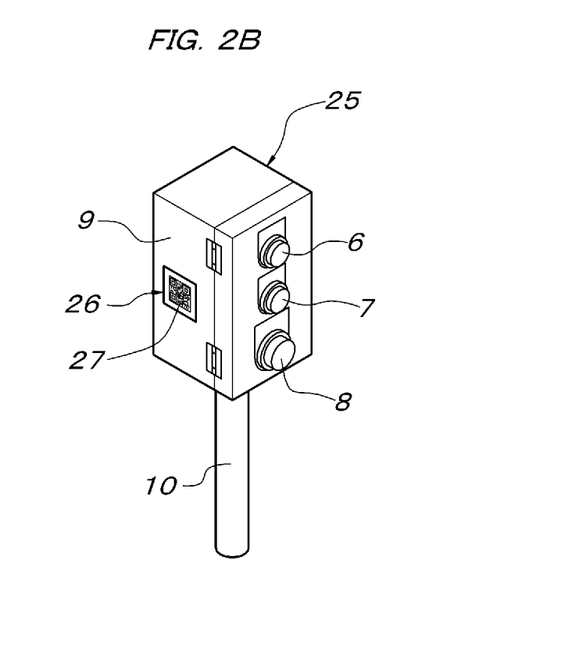
FIG. 2B is a perspective view showing a manual operation means additionally provided in the mechanical equipment.

Mechanical equipment 13 shown in FIG. 2A includes a carrier 14 which has a pair of left and right freely openable/closeable arms 14a for support of the workpiece, a trolley conveyor 15 which drives the carrier 14 such that the carrier 14 travels along a fixed traveling path, a floor conveyor 17 which includes a conveyance carriage 16, and a raising/lowering conveyance apparatus 19 which raises and lowers a workpiece 18 so as to transfer the workpiece 18 between the carrier 14 and the conveyance carriage 16 in both the conveyors 15 and 17. In the raising/lowering conveyance apparatus 19, an arm opening/closing means 20 which opens and closes the arms 14a of the carrier 14 in the trolley conveyor 15 that is stopped at a fixed position, a pair of left and right lifters 22 which respectively have forks 21 for supporting both the left and right sides of the workpiece 18, and a raising/lowering drive means 23 which raises and lowers the pair of left and right lifters 22 in synchronism with each other are additionally provided. In the pair of left and right lifters 22, a fork advancing/retraction drive means 24 which drives the forks 21 so as to advance and retract them is provided. In the mechanical equipment 13 described above, a manual operation means 25 shown in FIG. 2B is additionally provided in a place where the entire mechanical equipment 13 can be seen. The manual operation means 25 has the same configuration as the manual operation means 5 shown in FIG. 1B as they are denoted by the same reference signs, and in an appropriate place on the outside surface of the operation box 9 thereof, a mechanical equipment identification signal transmission unit 26 is provided that transmits a mechanical equipment identification signal for identifying the mechanical equipment 13 to the operation assistance terminal which will be described later. The mechanical equipment identification signal transmission unit 26 is also formed by sticking, to an appropriate place on the outside surface of the operation box 9, a sheet on which a two-dimensional code 27 indicating the mechanical equipment identification signal for identifying the mechanical equipment 13 is printed.

Figure 3:
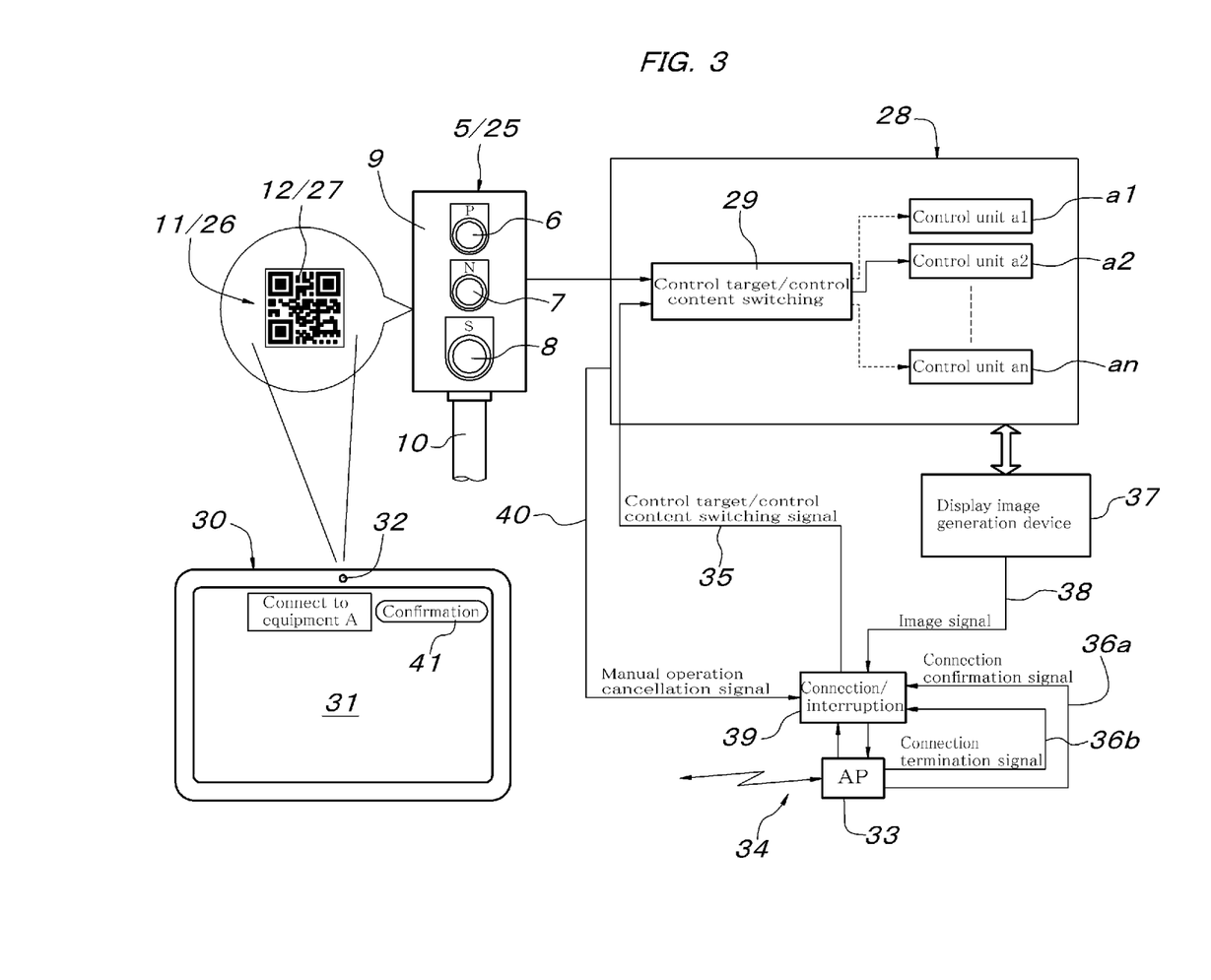
FIG. 3 is a block diagram illustrating the configuration of an embodiment of the present invention.

As shown in FIG. 3, in each of the mechanical equipment 1 and the mechanical equipment 13, a control device 28 is additionally provided which includes control units a1 to an for individually controlling the following control target devices forming each of the mechanical equipment 1 and the mechanical equipment 13. That is, in the mechanical equipment 1, the control target devices are control target devices such as the carriage drive means L1d to L4d, the entrance side path switching means P1 to P3, and the exit side path switching means P4 to P6, which are additionally provided in the respective conveyance carriage traveling lines L1 to L4, and in the mechanical equipment 13, the control target devices are a large number of control target devices such as the trolley conveyor 15, the floor conveyor 17, the arm opening/closing means 20, the raising/lowering drive means 23, the fork advancing/retraction drive means 24, and although they are unillustrated, a carrier lock means which locks the carrier 14 at the fixed position in the traveling path and a lock/unlock confirmation means thereof, an arm lock means which locks the arms 14a in a closed posture for supporting the workpiece and a lock/unlock confirmation means thereof, a workpiece determination means which detects the type of the workpiece 18 supported by the carrier 14, an advancing/retraction limit detection means for the forks 21, and a position detection means for the lifters 22. In the control device 28, a switching means 29 is provided which alternatively connects the manual operation means 5 and 25 included in each of the mechanical equipment 1 and the mechanical equipment 13 and each of the control units a1 to an in the control device 28. In addition, an operation assistance terminal 30 is used in combination which manually operates the control devices 28 in each of the mechanical equipment 1 and the mechanical equipment 13 and which can be carried by an operator.

As shown in FIG. 3, the operation assistance terminal 30 is a portable small PC which is generally referred to as a tablet and in which an input method is a touch screen method, and includes a screen 31 serving as a touch operation screen and a camera (image capturing device) 32, but may be a portable small PC in which a keyboard, a mouse, or an operation surface substituting those is an input device and in which a different input method is used. The operation assistance terminal 30 described above is connected to the control devices 28 of each of the mechanical equipment 1 and the mechanical equipment 13 via a wireless communication means 34 including access points 33 additionally provided in each of the mechanical equipment 1 and the mechanical equipment 13, and can transmit a control target/control content switching signal 35 for switching the switching means 29 of the control device 28 and a connection confirmation signal 36a or a connection termination signal 36b for the control device 28. In addition, in the control device 28, a display image generation device 37 is additionally provided. In order to perform a manual operation on the respective control units a1 to an included in the control device 28, the display image generation device 37 generates an image signal 38 for displaying, on the screen 31 of the operation assistance terminal 30, an image for disclosing necessary information. Reference sign 39 denotes a communication path connection/interruption means which is interposed in a communication system between the operation assistance terminal 30 and the control device 28, and receives a manual operation cancellation signal 40 which is output from the control device 28 when the connection confirmation signal 36a or the connection termination signal 36b transmitted from the operation assistance terminal 30 and operation signals from the manual operation means 5 and 25 are not continuously input to the control device 28 for a certain period of time so as to connect or interrupt the communication path.

Specific display content on the screen 31 of the operation assistance terminal 30 and a specific manual operation procedures will be described below. When an operator carrying the operation assistance terminal 30 moves to a place where the manual operation means 5 of the mechanical equipment 1 shown in FIG. 1 is present, and uses the camera (image capturing device) 32 of the operation assistance terminal 30 so as to shoot the two-dimensional code 12 stuck to the operation box 9 of the manual operation means 5, the mechanical equipment 1 identified by the two-dimensional code 12 is recognized by the operation assistance terminal 30, and a connection confirmation button 41 for confirming the connection to the mechanical equipment 1 is displayed on the screen 31. When the operator operates the connection confirmation button 41, the connection confirmation signal 36a for the mechanical equipment 1 is fed via the wireless communication means 34 to the communication path connection/interruption means 39, the communication path connection/interruption means 39 is brought into conduction and the display image generation device 37 feeds the image signal 38 for manually operating the mechanical equipment 1 to the operation assistance terminal 30. Consequently, on the screen 31 of the operation assistance terminal 30, a display as shown in FIG. 4 is produced.

Figure 4:
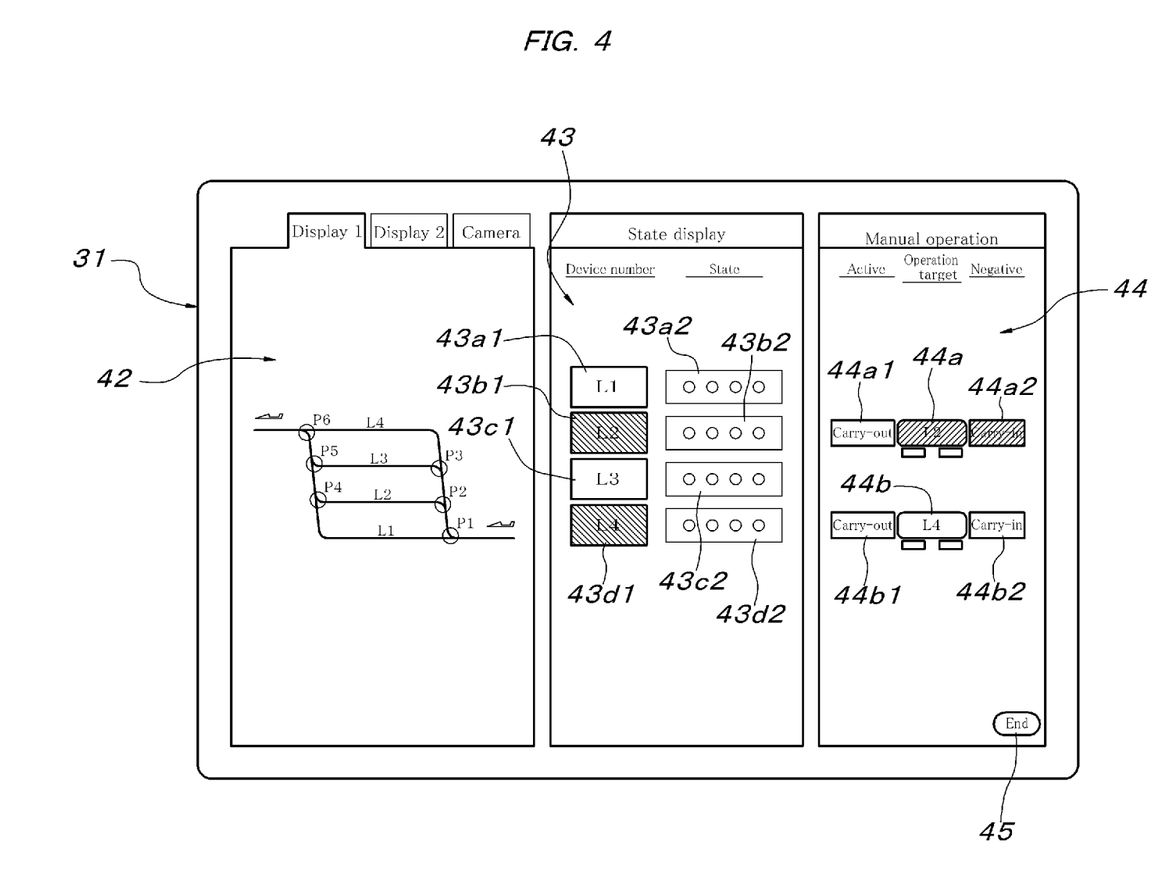
FIG. 4 is an illustrative view showing the screen configuration of an operation assistance terminal used in the manual operation of the mechanical equipment shown in FIG. 1A.

As described above, on the screen 31 of the operation assistance terminal 30, as shown in FIG. 4, various types of reference information on the mechanical equipment 1 are displayed such as a reference information display screen 42 on which various types of drawings, shot images and the like are displayed by switching of tabs, a mechanical equipment state display screen 43, and a manual operation assistance screen 44. The mechanical equipment state display screen 43 is formed with a plurality of device display sections 43a1 to 43d1 which display, for each of the conveyance carriage traveling lines L1 to L4 (actual control targets are the carriage drive means L1d to L4d) that are all the control target devices within the mechanical equipment 1, whether or not the manual operation can be performed and device state display sections 43a2 to 43d2 which display the states of the respective control target devices. The manual operation assistance screen 44 includes manually operated device selection buttons 44a and 44b for extracting and displaying manually operable devices displayed on the mechanical equipment state display screen 43 and selecting target devices for which manual operation is performed among the manually operable devices, and control content display sections 44a1 and 44a2 and 44b1 and 44b2 which display control content assigned to the respective operation switches 6 and 7 when the manually operated devices selected by the manually operated device selection buttons 44a and 44b are manually operated by the respective operation switches 6 and 7 of the manual operation means 5. It is noted that, although FIG. 4 illustrates the two manually operated device selection buttons 44a and 44b, this merely indicates that the two conveyance carriage traveling lines L2 and L4 are the manual operation targets at that time, and one or three or more can be possible.

As described above, when the two-dimensional code 12 is shot and the connection confirmation button 41 is operated from the manual operation means 5 of the mechanical equipment 1, and consequently, if, on the screen 31 of the operation assistance terminal 30 carried by the operator, the reference information display screen 42, the mechanical equipment state display screen 43, and the manual operation assistance screen 44 shown in FIG. 4 are displayed, the operator finds the states of all the conveyance carriage traveling lines L1 to L4 from the display state of the mechanical equipment state display screen 43, and simultaneously finds, from the fact that in the device display sections 43a1 to 43d1 corresponding to the respective conveyance carriage traveling lines L1 to L4, the display states of the conveyance carriage traveling lines L2 and L4 differ from the display states of the conveyance carriage traveling lines L1 and L3 (for example, displayed in a different color or display is flashing), that the conveyance carriage traveling lines L2 and L4 (the carriage drive means L2d and L4d) can be manually operated. On the other hand, on the manual operation assistance screen 44, the devices (the conveyance carriage traveling lines L2 and L4) which can be manually operated at that time are displayed as the manually operated device selection buttons 44a and 44b, and when the selected manually operated devices are manually operated by the manual operation means 5, it is possible to find, from the display of the control content display sections 44a1 and 44a2 and 44b1 and 44b2, that a carry-out operation is assigned to the operation switch 6 for the positive operation in the manual operation means 5 and that a carry-in operation is assigned to the operation switch 7 for the negative operation in the manual operation means 5.

Therefore, the operator can determine that the target to be manually operated from now is the conveyance carriage traveling line L2 by performing a touch operation on any of the manually operated device selection buttons 44a and 44b, for example, the selection button 44a. Based on this determination, the control target/control content switching signal 35 is transmitted from the operation assistance terminal 30 to the control device 28 of the mechanical equipment 1, and thus the switching means 29 of the control device 28 connects the manual operation means 5 and the control unit (for example, the control unit a2) for the conveyance carriage traveling line L2 (the carriage drive means L2d) which is the manual operation target among the control units a1 to an such that the control content previously assigned to the two operation switches 6 and 7 in the manual operation means 5 is performed by the operation of the operation switches 6 and 7. Thereafter, while visually checking the conveyance carriage traveling line L2 of the mechanical equipment 1 from the position of the manual operation means 5, and according to the indication of the control content display sections 44a1 and 44a2 and 44b1 and 44b2, the operator can operate the operation switch 6 of the manual operation means 5 to operate the carriage drive means for the exit path 4 and the carriage drive means L2d for the conveyance carriage traveling line L2 and also control the exit side path switching means P4 to carry out the conveyance carriage 2 within the conveyance carriage traveling line L2 from the conveyance carriage traveling line L2 to the exit path 4 or the operator can operate the operation switch 7 of the manual operation means 5 to operates the carriage drive means for the entrance path 3 and the carriage drive means L2d for the conveyance carriage traveling line L2 and also control the entrance side path switching means P2 to carry in the conveyance carriage 2 from the entrance path 3 into the conveyance carriage traveling line L2.

In the manual operation described above, in a case where the empty/present state of the conveyance carriage 2 in each of the conveyance carriage traveling lines L1 to L4 is grasped by the side of the control device 28, it is preferable to perform control such that when the conveyance carriage traveling line on which the conveyance carriage 2 is present is the manual operation target, of the operation switches 6 and 7 in the manual operation means 5, only the operation switch 6 to which the carry-out operation is assigned is made operable whereas when the conveyance carriage traveling line on which the conveyance carriage 2 is empty is the manual operation target, of the operation switches 6 and 7 in the manual operation means 5, only the operation switch 7 to which the carry-in operation is assigned is made operable.

It is noted that, when the manually operated device displayed on the manual operation assistance screen 44 of the operation assistance terminal 30 is, for example, only the conveyance carriage traveling line L2, in the manual operation described above, the carry-out operation of the conveyance carriage 2 from the conveyance carriage traveling line L2 or the carry-in operation of the conveyance carriage 2 to the conveyance carriage traveling line L2 is performed and the manual operation is completed. However, as shown in FIG. 4, when another manually operable device is present, and it is desired to operate the manually operable device, as described previously, after performing a touch operation on the manually operated device selection button 44b displaying the manually operable device (the conveyance carriage traveling line L4), the operation switch 6 or 7 in the manual operation means 5 may be operated according to the indication of the control content display sections 44b1 and 44b2 displayed on both sides thereof. When all the manual operations in the mechanical equipment 1 are completed, a touch operation is performed on an end button 45 which is present on the manual operation assistance screen 44. Consequently, the connection termination signal 36b is transmitted from the operation assistance terminal 30 to the control device 28, the connection of the manual operation means 5 and the control device 28 and the connection of the control device 28 and the operation assistance terminal 30 are cancelled, and the state returns to the initial state. As a matter of course, when the operation signals from the manual operation means 5 are not continuously received for a certain period of time, it is also possible that the manual operation cancellation signal 40 is transmitted from the side of the control device 28 to the operation assistance terminal 30 to cancel the connection of the manual operation means 5 and the control device 28 and the connection of the control device 28 and the operation assistance terminal 30.

In addition, in a case where it is the mechanical equipment 1 described in the embodiment discussed above, the screen to be displayed in the operation assistance terminal 30 may be only the manual operation assistance screen 44, and in a case where the reference information display screen 42 and the mechanical equipment state display screen 43 are present, they are helpful for grasping the configuration and situation of the mechanical equipment 1, and it is facilitated to accurately perform a manual operation on some devices forming the mechanical equipment 1.

Figure 5:
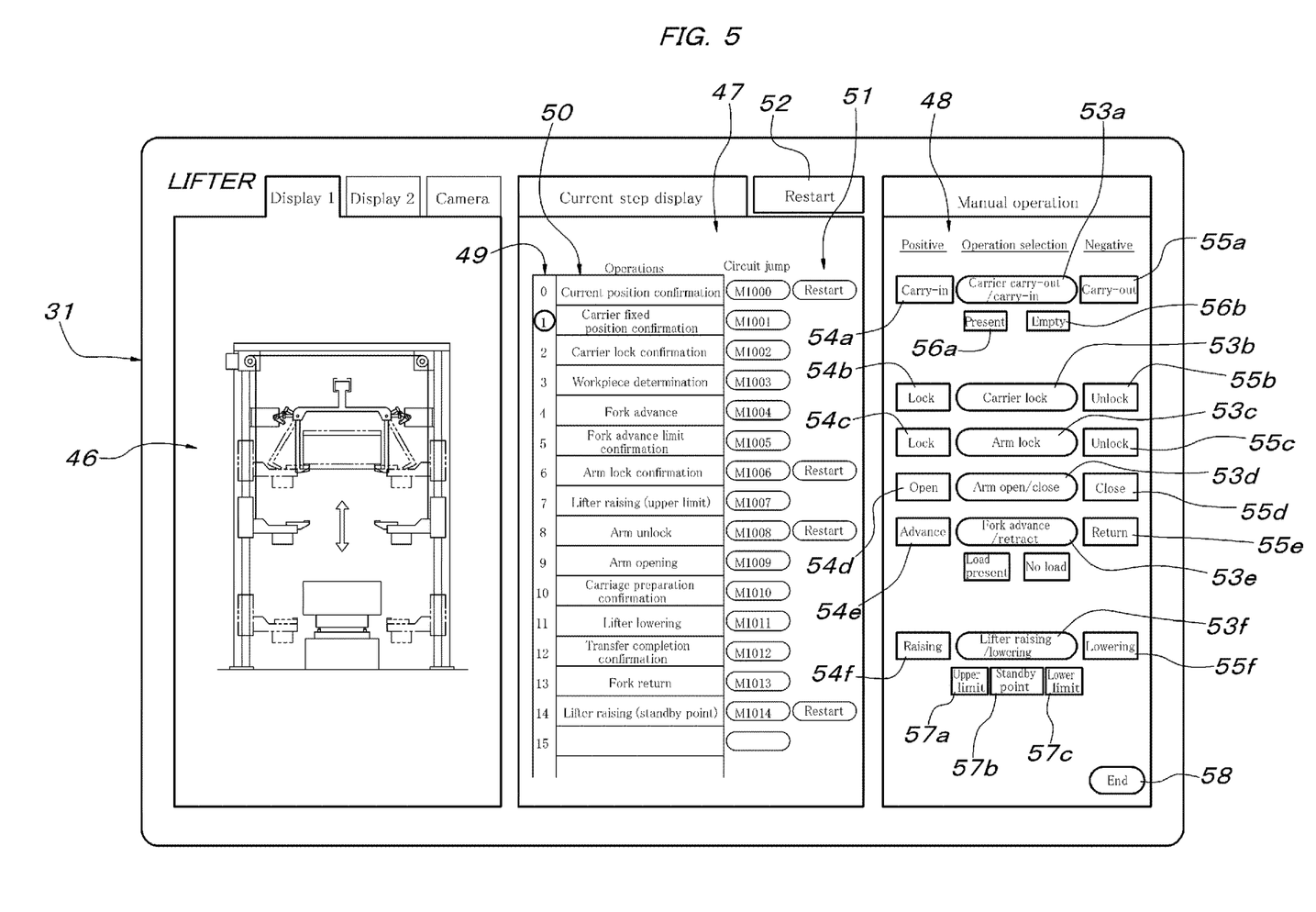
FIG. 5 is an illustrative view showing the screen configuration of an operation assistance terminal used in the manual operation of the mechanical equipment shown in FIG. 2A.

When the mechanical equipment 13 shown in FIG. 2 is the manual operation target, the operator carrying the operation assistance terminal 30 moves to a place where the manual operation means 25 of the mechanical equipment 13 shown in FIG. 2 is present, shoots the two-dimensional code 27 from the manual operation means 25 and operates the connection confirmation button 41, the operation assistance terminal 30 carried by the operator and the control device 28 of the mechanical equipment 13 are thereby connected via the wireless communication means 34, the image signal 38 for producing an image display for the manual operation of the mechanical equipment 13 is transmitted to the operation assistance terminal 30 from the display image generation device 37 additionally provided in the control device 28 of the mechanical equipment 13, and on the screen 31 of the operation assistance terminal 30, a reference information display screen 46, a mechanical equipment state display screen 47, and a manual operation assistance screen 48 shown in FIG. 5 are displayed. The reference information display screen 46 is the same as the reference information display screen 42 shown in FIG. 4, and various types of reference information on the mechanical equipment 13 such as various types of drawings and shot images are displayed by switching of tabs.

The mechanical equipment 13 transfers, with the lifters 22, the workpiece 18 conveyed by the carrier 14 of the trolley conveyor 15 onto the conveyance carriage 16 of the floor conveyor 17 or transfers, with the lifters 22, the workpiece 18 conveyed by the conveyance carriage 16 of the floor conveyor 17 to the carrier 14 of the trolley conveyor 15, therefore, in a case where the mechanical equipment 13 is manually operated, it is necessary to operate, in a predetermined order, all the control target devices (the carrier 14 to the fork advancing/retraction drive means 24 and various types of devices unillustrated and described above) forming the mechanical equipment 13. Therefore, in the mechanical equipment state display screen 47, a step operation display section 49 that displays a list of the individual operations for the transfer of the workpiece in the order of steps, a current step display section 50 that indicates, such as by lighting, which one of the steps is currently performed, a restart-enabled display section 51 that indicates a step where the restart can be performed, and a restart operation button 52 that can be operated when the current step is the step indicated by the restart-enabled display section 51 are provided.

In addition, the manual operation assistance screen 48 includes manually operated device selection buttons 53a to 53f which are necessary when the workpiece 18 is transferred between the carrier 14 of the trolley conveyor 15 and the conveyance carriage 16 of the floor conveyor 17 and control content display sections 54a to 54f and 55a to 55f which are arranged on both sides of the manually operated device selection buttons 53a to 53f. The control content display sections 54a to 54f display, for the case where the manual operation target devices selected by the manual operation target device selection buttons 53a to 53f are manually operated by the operation switch 6 of the manual operation means 25, the control content to the operation switch 6. The control content display sections 55a to 55f display, for the case where the manually operated devices selected by the manually operated device selection buttons 53a to 53f are manually operated by the operation switch 7 of the manual operation means 25, the control content assigned to the operation switch 7. It is noted that, among the manually operated device selection buttons 53a to 53f, specific manually operated device selection button(s), as shown in the figure, can be configured such that various types of information which are helpful when performing the manual operation are displayed.

Procedures and actions when the mechanical equipment 13 is manually operated by utilization of the mechanical equipment state display screen 47 and the manual operation assistance screen 48 displayed on the screen 31 of the operation assistance terminal 30 will be described. An operator can find, from the display content of the step operation display section 49 indicated by the current step display section 50 in the mechanical equipment state display screen 47, in which step the current stoppage occurs. It is found from the illustrated situation that the current step is in a state of "carrier fixed position confirmation" in step "1." Here, the "carrier" is the carrier 14 of the trolley conveyor 15 in the mechanical equipment 13 shown in FIG. 2, and it is possible to visually confirm that the carrier 14 supports the workpiece 18 or to confirm it from the state of lighting of auxiliary display sections 56a and 56b which are additionally provided in the manually operated device selection button 53a corresponding to "carrier carry-out/carry-in" and which indicate "present" or "empty," therefore, it is found that the carrier 14 supporting the workpiece 18 is stopping at the fixed position.

Considering from the above situation that the operation which has to be performed next is "carrier lock confirmation" in step "2," therefore, the operator performs a touch operation on the manually operated device selection button 53b corresponding to "carrier lock" in the manual operation assistance screen 48. Consequently, among the control units a1 to an (see FIG. 3) included in the control device 28 of the mechanical equipment 13, the control unit of the carrier lock means and the manual operation means 25 additionally provided in the mechanical equipment 13 are connected. At this time, the operator finds, from the display content of the control content display sections 54b and 55b on both sides of the manually operated device selection button 53b, that the "lock" operation of the carrier lock means is assigned to the operation switch 6 of the manual operation means 25 and that the "unlock" operation of the carrier lock means is assigned to the operation switch 7. Here, the carrier 14 at the fixed position needs to be locked, therefore, the operation switch 6 of the manual operation means 25 is operated. When, as a result of this operation, the corresponding device (carrier lock means) of the control device 28 is controlled, the carrier 14 is locked at the fixed position and the carrier lock state is confirmed, the display of the step operation display section 49 changes from step "2" to step "3," it is thereby found that the step transitioned to a step of "workpiece determination" The workpiece determination means included in the mechanical equipment 13 is automatically activated so as to perform the step of "workpiece determination" and as the workpiece 18 which is transferred to the conveyance carriage 16 of the floor conveyor 17 from now, the result of the determination thereof is recorded. Thereafter, the display of the step operation display section 49 changes from step "3" to step "4," and the step transitions to a step of "fork advance."

The operator confirms, from the state of lighting of auxiliary display sections 57a to 57c which are additionally provided in the manually operated device selection button 53f corresponding to "lifter raising/lowering" and which indicate "upper limit," "standby point," and "lower limit," or visually, that the lifters 22 are positioned in a standby point at an intermediate height, and then performs the step of "fork advance." That is, by performing a touch operation on the manually operated device selection button 53e corresponding to "fork advance/retract" in the manual operation assistance screen 48 to connect, among the control units a1 to an (see FIG. 3) included in the control device 28 of the mechanical equipment 13, the control unit for controlling the fork advancing/retraction drive means 24 and the manual operation means 25 additionally provided in the mechanical equipment 13. At this time, the operator finds, from the display content of the control content display sections 54e and 55e on both sides of the manually operated device selection button 53e, that a "fork advance" operation is assigned to the operation switch 6 of the manual operation means 25 and that a "fork return" operation is assigned to the operation switch 7, and therefore the operator operates the operation switch 6 of the manual operation means 25 to perform the advance operation on the forks 21 by the fork advancing/retraction drive means 24. When it is confirmed that the forks 21 move to advance to the advance limit position, the display of the step operation display section 49 changes from step "4" to step "5," and it is displayed that the "fork advancing/retraction confirmation" is performed.

Next, when it is confirmed that the arms 14a of the carrier 14 at the fixed position are locked in a closed state so as to support the workpiece 18, the display of the step operation display section 49 changes from step "5" to step "6," and "arm lock confirmation" is performed. When the "arm lock confirmation" is completed, the display of the step operation display section 49 changes from step "6" to step "7," and it is displayed that the transition to a step of "lifter raising (upper limit)" is made. In order to perform the step of "lifter raising (upper limit)," the operator performs a touch operation on the manually operated device selection button 53f corresponding to "lifter raising/lowering" in the manual operation assistance screen 48 to connect, among the control target devices a1 to an (see FIG. 3) included in the control device 28 of the mechanical equipment 13, the control unit of the raising/lowering drive means 23 and the manual operation means 25 additionally provided in the mechanical equipment 13. At this time, the operator finds, from the display content of the control content display sections 54*f* and 55*f* on both sides of the manually operated device selection button 53*f*, that a "lifter raising" operation is assigned to the operation switch 6 of the manual operation means 25 and that a "lifter lowering" operation is assigned to the operation switch 7, and therefore the operator operates the operation switch 6 of the manual operation means 25 to perform the raising operation on the lifters 22 by the raising/lowering drive means 23.

When the lifters 22 in a state where the forks 21 have advanced to the advance limit position are raised to a raising limit, the workpiece 18 which is stopped at the fixed position and which is supported by the arms 14*a* of the carrier 14 is scooped up by the forks 21, and it is possible to confirm, from the state of lighting of the auxiliary display section 57*a* which is additionally provided in the manually operated device selection button 53*f* corresponding to "lifter raising/lowering" and which indicates "upper limit," or visually, that the lifters 22 reach the raising limit. Therefore, according to the fact that the display of the step operation display section 49 changes to the subsequent step "8," that is, a step of "arm unlock," a touch operation is performed on the manually operated device selection button 53*c* corresponding to the "arm unlock" in the manual operation assistance screen 48 to connect, among the control target devices a1 to an (see FIG. 3) included in the control device 28 of the mechanical equipment 13, the control unit of the arm lock means and the manual operation means 25 additionally provided in the mechanical equipment 13. At this time, it is found, from the display content of the control content display sections 54*c* and 55*c* on both sides of the manually operated device selection button 53*c*, that the "lock" operation is assigned to the operation switch 6 of the manual operation means 25 and that the "unlock" operation is assigned to the operation switch 7, therefore, the operation switch 7 of the manual operation means 25 is operated so as to unlock the arms 14*a* of the carrier 14 after the transfer of the workpiece 18 to the side of the lifters 22 and thereby switch to the openable state.

When the unlocking of the arms 14*a* is performed, the display of the step operation display section 49 changes from step "8" to step "9," and the step transitions to a step of "arm opening." Therefore, the operator performs a touch operation on the manually operated device selection button 53*d* corresponding to "arm open/close" in the manual operation assistance screen 48 to connect, among the control target devices a1 to an (see FIG. 3) included in the control device 28 of the mechanical equipment 13, the control unit of the arm opening/closing means 20 and the manual operation means 25 additionally provided in the mechanical equipment 13. At this time, it is found, from the display content of the control content display sections 54*d* and 55*d* on both sides of the manually operated device selection button 53*d*, that an "open" operation is assigned to the operation switch 6 of the manual operation means 25 and that a "close" operation is assigned to the operation switch 7, therefore, the operation switch 6 of the manual operation means 25 is operated so as to open the arms 14*a* of the carrier 14 with the arm opening/closing means 20. After the arms 14*a* of the carrier 14 are opened, the step in the step operation display section 49 changes from "9" to "10," it is displayed that a step of "carriage preparation confirmation" is entered, when the conveyance carriage 16 of the floor conveyor 17 is brought into a state where the conveyance carriage 16 is on standby at the fixed position for receiving the workpiece 18 from the lifters 22, the carriage preparation confirmation is completed, the step in the step operation display section 49 changes from "10" to "11" and an instruction to perform a step of "lifter lowering (lower limit)" is provided.

In order to perform the step of "lifter lowering (lower limit)," the operator performs a touch operation on the manually operated device selection button 53*f* corresponding to "lifter raising/lowering" in the manual operation assistance screen 48 to connect, among the control target devices a1 to an (see FIG. 3) included in the control device 28 of the mechanical equipment 13, the control unit of the raising/lowering drive means 23 and the manual operation means 25 additionally provided in the mechanical equipment 13. At this time, the operator finds, from the display content of the control content display sections 54*f* and 55*f* on both sides of the manually operated device selection button 53*f*, that a "lifter lowering" operation is assigned to the operation switch 7 of the manual operation means 25, and therefore the operator operates the operation switch 7 of the manual operation means 25 to perform the lowering of the lifters 22 to the lower limit by the raising/lowering drive means 23. Consequently, the workpiece 18 supported by the forks 21 of the lifters 22 is passed between the opened arms 14*a* of the carrier 14 so as to be lowered, and is transferred onto the conveyance carriage 16 of the floor conveyor 17 which is on standby at the fixed position, and thereafter the empty lifters 22 reach the lowering limit so as to be stopped. Consequently, the step in the step operation display section 49 changes from "11" to "12," "transfer completion confirmation" is performed, when it is confirmed that the transfer of the workpiece 18 onto the conveyance carriage 16 is completed, the step in the step operation display section 49 changes from "12" to "13" and an instruction to perform a step of "fork return" is provided.

In order to perform the "fork return" in the manual operation assistance screen 48, the operator performs a touch operation on the manually operated device selection button 53*e* corresponding to "fork advance/retract" to connect, among the control target devices a1 to an (see FIG. 3) included in the control device 28 of the mechanical equipment 13, the control unit of the fork advancing/retraction drive means 24 and the manual operation means 25 additionally provided in the mechanical equipment 13. At this time, the operator finds, from the display content of the control content display sections 54*e* and 55*e* on both sides of the manually operated device selection button 53*e*, that the "fork return" operation is assigned to the operation switch 7 of the manual operation means 25, and therefore the operator operates the operation switch 7 of the manual operation means 25 to perform the retracting operation on the forks 21 by the fork advancing/retraction drive means 24. When it is confirmed that the forks 21 move to retract to a retract limit position, the display of the step operation display section 49 changes from step "13" to step "14," and an instruction to perform a step of "lifter raising (standby point)" is provided.

Here, in order to perform the step of "lifter raising (standby point)," the operator performs a touch operation on the manually operated device selection button 53*f* corresponding to "lifter raising/lowering" in the manual operation assistance screen 48 to connect, among the control target devices a1 to an (see FIG. 3) included in the control device 28 of the mechanical equipment 13, the control unit of the raising/lowering drive means 23 and the manual operation means 25 additionally provided in the mechanical equipment 13. At this time, the operator finds, from the display content of the control content display sections 54*f* and 55*f* on both sides of the manually operated device selection button

53f, that a "lifter raising" operation is assigned to the operation switch 6 of the manual operation means 25, and therefore the operator operates the operation switch 6 of the manual operation means 25 to raise the lifters 22, by the raising/lowering drive means 23, to the standby point at the intermediate height between the trolley conveyor 15 and the floor conveyor 17. As a result of the lifters 22 having reached the standby point and stopped, the display of the step operation display section 49 returns from step "14" to step "0," and the step returns to a "current position confirmation" step for the carrier 14 of the trolley conveyor 15.

As described above, a series of the manual operations for the transfer of the workpiece 18 from the carrier 14 of the trolley conveyor 15 onto the conveyance carriage 16 of the floor conveyor 17 are completed. In the configuration described in this embodiment, in the stage of "current position confirmation" in step "0," in the stage of "arm lock confirmation" in step "6," in the stage of "arm unlock" in step "8," and in the stage of "lifter raising (standby point)" in step "14," the restart-enabled display section 51 is lit, and it is displayed that it is possible to perform the restart. Therefore, it is possible to perform a touch operation in these stages on the restart operation button 52 to restart the mechanical equipment 13 from the manual operation, and switch to the automatic operation.

When all the manual operations in the mechanical equipment 13 are completed, a touch operation is performed on an end button 58 in the manual operation assistance screen 48. Consequently, as shown in FIG. 3, the connection termination signal 36b is transmitted from the operation assistance terminal 30 to the control device 28 of the mechanical equipment 13, the connection of the manual operation means 5 and the control device 28 and the connection of the control device 28 and the operation assistance terminal 30 are cancelled, and the state returns to the initial state. As a matter of course, as described in the manual operation in the mechanical equipment 1, when the operation signals from the manual operation means 25 are not continuously received for a certain period of time, it is also possible that the manual operation cancellation signal 40 is transmitted from the side of the control device 28 of the mechanical equipment 13 to the operation assistance terminal 30 to cancel the connection of the manual operation means 25 and the control device 28 and the connection of the control device 28 and the operation assistance terminal 30.

It is noted that the wireless communication means 34 used in the embodiment described above can be replaced, depending on the case, such as by a communication means of a wired system utilizing a communication line which connects the manual operation means 5/25 and the operation assistance terminal 30 such that they can be freely separated.

In addition, although in the manual operation means 5/25 adopted in the preferred embodiment of the present invention, only the two operation switches 6 and 7 to which the operations opposite to each other are assigned are provided, and in addition to the two operation switches 6 and 7, the emergency stop operation switch 8 is added, there is no limitation to this configuration. For example, a configuration may be adopted in which only the two operation switches are provided and in which the emergency stop operation switch 8 is not provided. In addition, the operation switch which is provided in the manual operation means 5/25 and which is used in common for the control of the individual control target devices is not limited to the two operation switches to which the operations opposite to each other are assigned, and one operation switch or three or more operation switches may be adopted. As the one operation switch, in addition to an ON/OFF switch which can alternately switch one operation unit between an ON (turn-on) position and an OFF (turn-off) position, an input switch which can hold an ON (turn-on) state in an internal circuit, an enable switch or the like can be utilized. The enable switch is an operation switch which is used as a safety measure when the operator performs an irregular operation such as maintenance, and is one operation switch in which the intermediate position of an operation unit is an ON (turn-on) position and in which an OFF (turn-off) position is made when the operation unit is made to proceed to a terminal position or the position is automatically returned to the initial position by releasing the hand.

As an example of the above-described case where one operation switch is adopted, in a case where a plurality of control target devices included in one mechanical equipment are only alternatively started up or conveyors C on which automatic stop control is performed after a predetermined operation and which convey the workpiece, for example, only in one direction are adopted, in the manual operation means 5/25 included in the mechanical equipment, as one operation switch S, one of the ON/OFF switch, the input switch, the enable switch and the like which are descried above is provided, for one manual operation target conveyor C selected from the conveyors C, control content (for example, startup) assigned to the operation switch S of the manual operation means 5/25 is displayed in a control content display section on a manual operation assistance screen of the operation assistance terminal 30, the control device 28 receives the control target device switching signal 35 from the operation assistance terminal 30 via the wireless communication means 34 so as to connect the control unit of the identified one conveyor C and the one operation switch S in the manual operation means 5/25, and the one operation switch S is operated such that the control (for example, startup) assigned to the operation switch S can be performed by the selected one conveyor C.

A control system for mechanical equipment according to the present invention can be utilized as a system which can perform a manual operation accurately and easily, and for example, various types of mechanical equipment arranged in an automobile assembly line are used together with an operation assistance terminal referred to as a tablet, so as to simplify manual operation means (operation panels) provided together with each mechanical equipment.

What is claimed is:

1. A control system for mechanical equipment, the mechanical equipment including a plurality of control target devices, a control device operable to control the control target devices, and a manual operator control console, the control system comprising:
   a portable operation assistance terminals:
   a communication means which connects the portable operation assistance terminal and the control device;
   the manual operator control console including an operation switch operable to control the control target devices and including a mechanical equipment identifier for identifying the mechanical equipment to the portable operation assistance terminal, where the mechanical equipment identifier comprises a code displayed on an outside surface of the manual operator control console;
   the portable operation assistance terminal including an image capturing means operable to read and receive the code displayed on the manual operator control console and the portable operation assistance terminal being operable to display a manual operation assistance screen based on the mechanical equipment identifier, the manual operation assistance screen including a manually operated device selection section for selecting a selected control target device from the plurality of control target devices, and including a control content display section which displays control content assigned to the operation switch of the manual operator control console for the selected control target device; and the control device being operable to receive, a control target device switching signal from the portable operation assistance terminal, via the communication means, the control target device switching signal being identified by an operation on the manually operated device selection section and being operable to connect a control unit of the selected control target device and the operation switch of the manual operator control console such that when an operation is performed on the operation switch of the manual operator control console, the control assigned to the operation switch is performed by the selected control target device.

2. The control system for mechanical equipment according to claim 1, the manual operator control console includes two operation switches to which operations opposite to each other are assigned and an emergency stop switch.

3. The control system for mechanical equipment according to claim 1, wherein:

the portable operation assistance terminal includes a display surface which displays a drawing or a photograph of a configuration of the corresponding mechanical equipment.

4. The control system for mechanical equipment according to claim 1 wherein:

the mechanical equipment can operate each of the control target devices with arbitrary timing; and a mechanical equipment state display screen is provided in the portable operation assistance terminal which displays a list of all the control target devices in the mechanical equipment and a state indicating whether or not each of the control target devices in the list can be manually operated.

5. A control system for mechanical equipment, the mechanical equipment including a plurality of control target devices, a control device operable to control the control target devices, and a manual operator control console, the control system comprising:

a portable operation assistance terminal;

a communication means which connects the portable operation assistance terminal and the control device;

the manual operator control console including an operation switch operable to control the control target devices and including a mechanical equipment identifier for identifying the mechanical equipment to the portable operation assistance terminal;

the portable operation assistance terminal being operable to receive the mechanical equipment identifier and to display a manual operation assistance screen based on the mechanical equipment identifier, the manual operation assistance screen including a manually operated device selection section for selecting a selected control target device from the plurality of control target devices, and including a control content display section which displays control content assigned to the operation switch of the manual operator control console for the selected control target device;

the control device being operable to receive a control target device switching signal from the portable operation assistance terminal, via the communication means, the control target device switching signal being identified by an operation on the manually operated device selection section and being operable to connect a control unit of the selected control target device and the operation switch of the manual operator control console such that when an operation is performed on the operation switch of the manual operator control console, the control assigned to the operation switch is performed by the selected control target device;

the mechanical equipment identifier including a code displayed on an external surface of the manual operator control console;

the portable operation assistance terminal including an image capturing means operable to read the code displayed on the manual operator control console;

the mechanical equipment operating the respective control target devices in a set order; and a mechanical equipment state display screen being provided in the portable operation assistance terminal which displays a list of operations of the respective control target devices in the set order and which displays an indication of a state of progress of a manually operated operation.

6. A control system for mechanical equipment, the mechanical equipment including a plurality of control target devices, a control device operable to control the control target devices, and a manual operator control console, the control system comprising:

a portable operation assistance terminal;

a communication means which connects the portable operation assistance terminal and the control device;

the manual operator control console including an operation switch operable to control the control target devices and including a mechanical equipment identifier for identifying the mechanical equipment to the portable operation assistance terminal;

the portable operation assistance terminal being operable to receive the mechanical equipment identifier and to display a manual operation assistance screen based on the mechanical equipment identifier, the manual operation assistance screen including a manually operated device selection section for selecting a selected control target device from the plurality of control target devices, and including a control content display section which displays control content assigned to the operation switch of the manual operator control console for the selected control target device;

the control device being operable to receive a control target device switching signal from the portable operation assistance terminal, via the communication means, the control target device switching signal being identified by an operation on the manually operated device selection section and being operable to connect a control unit of the selected control target device and the operation switch of the manual operator control console such that when an operation is performed on the operation switch of the manual operator control console, the control assigned to the operation switch is performed by the selected control target device;

the mechanical equipment identifier including a code displayed on an external surface of the manual operator control console;

the portable operation assistance terminal including an image capturing means operable to read the code displayed on the manual operator control console; and the control device being operable to receive an operation signal from a second portable operation assistance terminal when a manual operation completion condition set on a side of the control device is satisfied or when a termination signal is received from a first portable operation assistance terminal.

* * * * *